United States Patent
May et al.

(10) Patent No.: US 7,183,558 B2
(45) Date of Patent: Feb. 27, 2007

(54) DISTRIBUTED UV SENSOR SYSTEM AND METHOD

(75) Inventors: Joe T. May, Leesburg, VA (US); David C. Snyder, Frederick, MD (US); James M. Raymont, Sterling, VA (US); Matthew J. McConnell, Ashburn, VA (US); Edward A. Casacia, Sterling, VA (US); Kyle L. Bostian, Frederick, MD (US)

(73) Assignee: Electronic Instrumentation and Technology, Inc., Sterling, VA (US)

( * ) Notice: Subject to any disclaimer, the term of this patent is extended or adjusted under 35 U.S.C. 154(b) by 0 days.

(21) Appl. No.: 11/354,973

(22) Filed: Feb. 16, 2006

(65) Prior Publication Data

US 2006/0131510 A1    Jun. 22, 2006

Related U.S. Application Data

(63) Continuation of application No. 10/834,877, filed on Apr. 30, 2004.

(51) Int. Cl.
*G01J 1/42* (2006.01)

(52) U.S. Cl. ..................................... 250/372
(58) Field of Classification Search ........... 340/539.29, 340/600; 250/372, 484.5
See application file for complete search history.

(56) References Cited

U.S. PATENT DOCUMENTS

| | | | |
|---|---|---|---|
| 4,578,583 A * | 3/1986 | Ciammaichella et al. ... 250/372 |
| 5,306,917 A | 4/1994 | Black et al. |
| 5,424,547 A * | 6/1995 | Stark et al. .................. 250/372 |
| 5,686,727 A | 11/1997 | Reenstra et al. |
| 5,929,450 A | 7/1999 | Glasheen et al. |
| 6,023,066 A * | 2/2000 | Cain et al. .................. 250/372 |
| 6,278,120 B1 | 8/2001 | May |
| 6,404,342 B1 * | 6/2002 | Planer et al. ............... 340/577 |
| 6,566,656 B2 | 5/2003 | May et al. |
| 6,700,496 B2 * | 3/2004 | Francke et al. ............. 340/578 |
| 6,873,256 B2 * | 3/2005 | Lemelson et al. ....... 340/539.1 |

FOREIGN PATENT DOCUMENTS

JP    2002358590 A  * 12/2002

* cited by examiner

*Primary Examiner*—David Porta
*Assistant Examiner*—Frederick F. Rosenberger
(74) *Attorney, Agent, or Firm*—Whitman, Curtis, Christofferson & Cook, PC

(57) ABSTRACT

A radiometer that incorporates multiple UV bandwidth sensors, defined in nanometers, and includes connectors for inserting a cable that is used to connect to another sensor, or to a data collection module (DCM) in a multidrop, or daisy-chain arrangement. Each sensor can be positioned at any point on a three-dimensional work piece, and will receive UV energy at the aperture having an optical component. The collected energy is directed to a detector in the sensor. A processor in the body of the sensor then computes the amount of UV radiation based on signals from the detector. This information is transferred to and stored in a data collection module to which the sensor string is connected. Data stored in the DCM can then be transferred to a computer for display purposes. The sensors and DCM can be tethered to the computer for real-time measurement readings when adjusting the UV lamps.

4 Claims, 6 Drawing Sheets

DISTRIBUTED UV SENSOR SYSTEM AND METHOD

Related Application

This application is a continuation application of U.S. Ser. No. 10/834,877 filed Apr. 30. 2004, and its contents are incorporated herein by reference.

BACKGROUND OF THE INVENTION

1. Field of the Invention

The present invention generally relates to a measurement system for UV irradiance and energy density and, more particularly, to a measurement system having a plurality of ultraviolet sensors that can be easily mounted or attached at critical locations on dimensional and shaped objects to measure the levels of UV irradiance and energy density at multiple points simultaneously.

2. Background Description

Current methods for polymer curing (e.g., heat curing) may be undesirable for a variety of reasons. UV curing, is currently not a preferable method due to the taxing process of measuring the UV exposure on multiple points of the form to be cured, adjusting the lighting to meet the appropriate UV levels (as determined by the manufacturer of the polymer) and then repeating the process until all areas of the form receive the necessary amount of UV exposure to initiate the curing process. As a result, the UV curing process is not being exploited to its full potential as a valuable and noninvasive manufacturing method.

Other than the undesirable procedure, the product of proper UV curing is highly desirable. To make it possible, despite the multiple measurements, a probe style radiometer, as disclosed in U.S. Pat. No. 6,566,656, and hereby incorporated by reference, computes the amount of UV radiation at the end point of the probe. Further, U.S. Pat. No. 6,278,120, also hereby incorporated by reference, discloses a UV sensor having an optical component and photodetector. Both of sensors can measure the UV exposure at a single location at any time, however, neither sensor can measure the UV exposure at multiple points facing in multiple directions simultaneously.

A further known method, taught by Kuhnast Strahlungstechnick, is a multi-disc instrument for measuring the UV energy in the UV-curing sector. This method allows for multiple UV sensors to be placed simultaneously, but may still require each sensor to be selected to take a measurement individually. Further, as each "disc" of the multi-disc system engages directly with a main component providing the power and recording each disc's individual measurements, the number of discs that can be attached is greatly limited, and the range of the sensors from the main component for recording UV measurements is also limited.

SUMMARY OF THE INVENTION

It is therefore an object of the present invention to provide a UV irradiation measurement system to be used in the process of curing polymers.

It is a further object of the invention to provide a display and user interface with the UV irradiation measurement system whereby the user can identify the measurement taken by a selected sensor in a sensor array.

It is a further object of the invention to provide a method for using a UV irradiation measurement system to be used in the process of curing polymers.

It is a further object of the invention to provide a method whereby the user can identify the measurement taken by a selected sensor in the UV irradiation measurement system.

According to the invention, there is provided a UV sensor system, comprising a UV sensor having an optical system and microprocessor positioned in a housing, the UV sensor detecting UV irradiation; and a positioner for application to an object having a cavity for releasably receiving the UV sensor. The UV sensor system includes a securing means on a peripheral portion of the cavity of the positioner which interacts with peripheral surfaces of the housing of the UV sensor. The UV sensor system includes a light emitting diode which can be selectively illuminated within an indented region in the housing element whereby the indented region provides a passage for a cable to extend from either the top or bottom of the positioner after the UV sensor is received in the positioner. The UV sensor system comprises a plurality of UV sensors; a data collection module for collecting UV irradiation data from the UV sensors; and cables connecting the UV sensors to a data collection module, and connecting the remaining UV sensors together. The data collection module includes a means for storing data and communicating data to either a computer or a personal data assistant via a cable. The data connection module may provide the UV irradiation data to a display either as the measurements are made or at a point in time after said measurements are made. The UV sensor system presents UV irradiation data using milliwatts (mW) per square centimeters ($cm^2$).

A method for detecting UV exposure in three dimensions is provided, the method comprising the steps of: distributing a plurality of UV sensors in a three dimensional array wherein at least two of the UV sensors are oriented at different angles, different height dimensions, or different width dimensions relative to each other, exposing the three dimensional array to UV irradiation; and collecting UV irradiation data from each of the UV sensors. The UV sensors are connected to together by cables and secured to a three dimensional object using a plurality of positioners (one per sensor) whereby the top of each UV sensor (containing the optical system) is in a common plane with the surface of the object after it is received in the cavity of the positioner. The method further includes the step of storing UV irradiation data in the data collection module which is connected to the UV sensors via cables and then transmitting the UV irradiation data from the data collection module to either a computer or a personal data assistant.

While the invention is particularly adaptable to a three-dimensional system, the system can be used for flat surfaces (two-dimensional) to measure the energy arriving at the surface when passed through a UV oven under a row of UV lamps that are the same distance from the surface of the item. This would be used to measure the uniformity and/or focus of the lamps over a flat surface and/or in an exposure frame.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
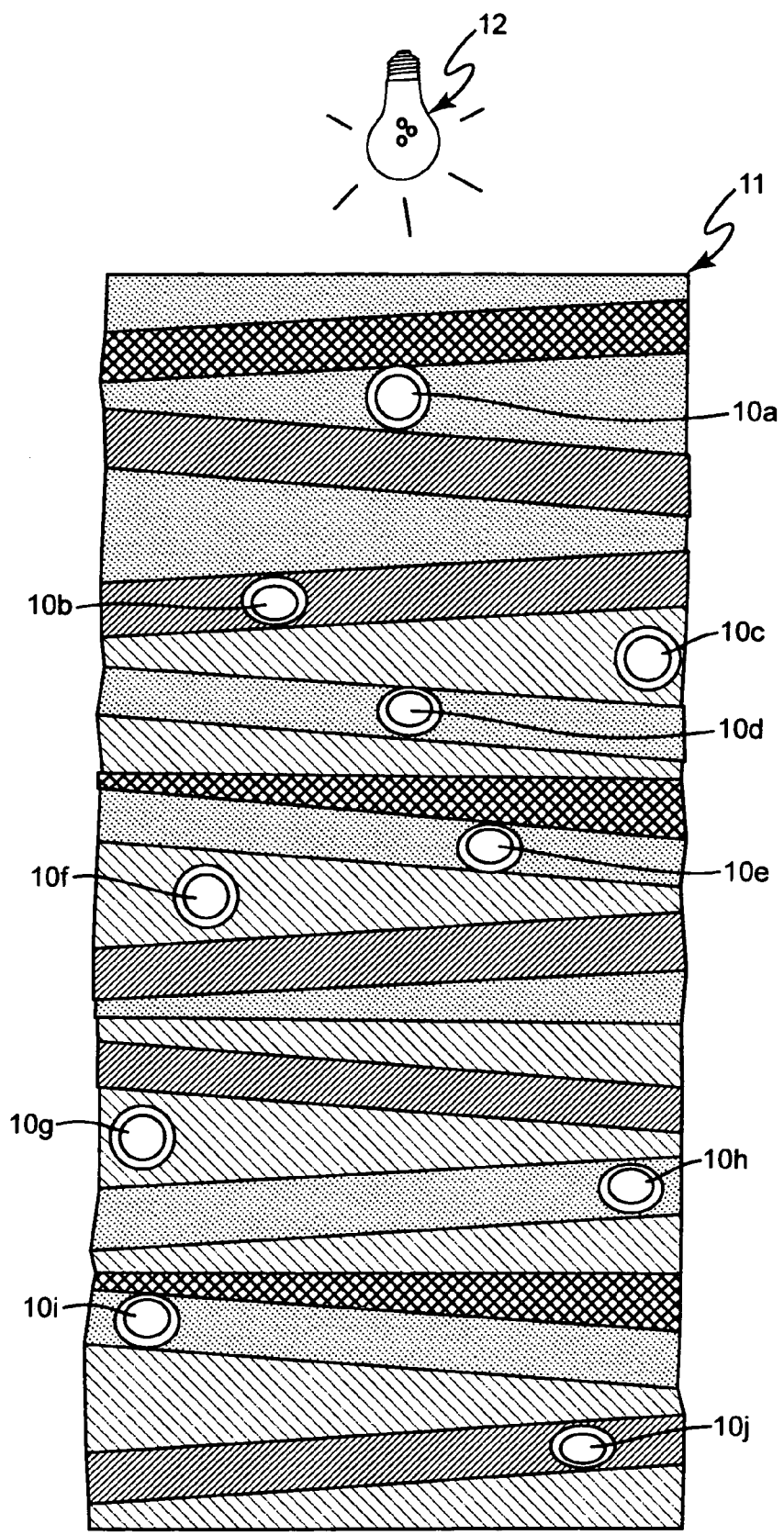
FIG. 1 is an illustration of a form having a variety of angled surfaces and having ten UV sensor systems in accordance with the invention each having a different relationship to the ultraviolet light source.

Referring now to the drawings, and more particularly to FIG. 1, there is shown an object 11 having a variety of angled surfaces and having ten UV sensor systems 10a through 10i in accordance with the invention each having a different relationship to the ultraviolet light source 12. For example, sensor 10a is applied to a surface facing the UV light source 12, and is in close proximity to the light source 12. Sensor 10j, on the other hand, is positioned at a greater distance from the light source than sensor 10a, and is on a surface facing downward (away from the light source). In this scenario, if only sensor 10a were used as a representative point of measurement for the entire object 11, only the plane containing sensor 10a (and planes in similar proximity and angle to the light source 12 as 10a) would cure properly as a result of UV exposure. The remaining parts, receiving inadequate light exposure would not cure properly, and will warp or otherwise degrade and be of poor quality.

However, using the invention to take measurements at each of the sensor locations 10a–10j, more light sources can be added, and existing light sources adjusted until each sensor measures a UV level appropriate for proper curing. Sensor 10a is connected to sensor 10b which is then connected to sensor 10c, and so on, such that sensors 10a14 10j are successively connected in a daisy-chain formation. With this method of connection, the sensors can reach a great distance from the data collection module, and the number of sensors joined in the daisy chain may be up to 32 or greater.

Figure 2:
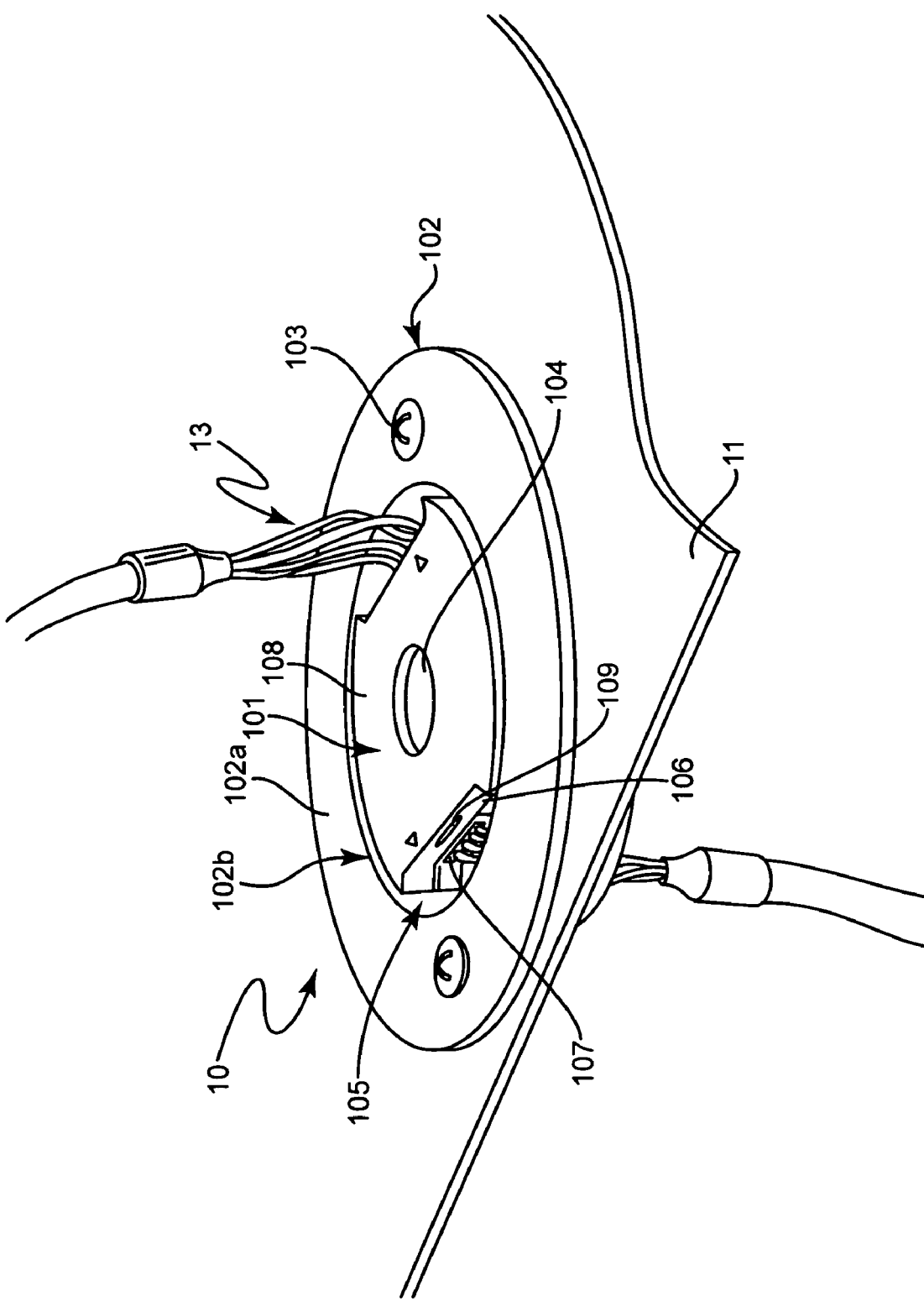
FIG. 2 shows the UV sensor system applied to an object.

Referring now to FIG. 2, an UV sensor system is shown comprising a UV sensor 101 and a positioner 102 securely applied to an object. The UV sensor 101 has an optical system 104 and a microcontroller (not shown) positioned in a housing 108. The housing 108 is substantially circular from a top or bottom view with the exception of indented regions 105. Each indented region 105 hosts an input 107 for a cable 13, a light emitting diode 106, and an indenture 109 for assisting in the removal of the UV sensor 101 from the positioner 102.

The positioner 102 is applied to an object 11 by creating a hole in the object 11, and fitting the positioner 102 into the hole of the object. It should be noted that in such a configuration, the object is an exemplary form, identical to a form to be cured via UV exposure, and serving as a test subject for accurately determining the lighting array needed to accommodate the object's form. Once the lighting array is determined, proper curing can be reliably and repeatably performed on multiple productions of the same form. The positioner 102 includes an outwardly projecting flange section 102a along a peripheral portion and is attached to the object by a securing means 103 such as screws or an adhesive. The positioner provides a cavity formed as a bore hole 102b which extends through the entirety of the positioner from top to bottom. The UV sensor 101 fits snugly into the cavity 102b of the positioner 102, and any cables 14 attached to the UV sensor 101 can extend towards either a top or a bottom direction through the passage provided between the indented regions 105 of the UV sensor 101 and the bore hole 102b of the positioner 102.

A particular benefit of the UV sensor system configuration is due to the positioner being sunken into the test form where the UV sensor is then inlaid into the positioner, thereby allowing the optical component of the UV sensor to be very close to, if not exactly flush with the surface of the test form. The result is a more accurate measurement of the UV irradiation that the particular region of the part is exposed to.

Figure 3:
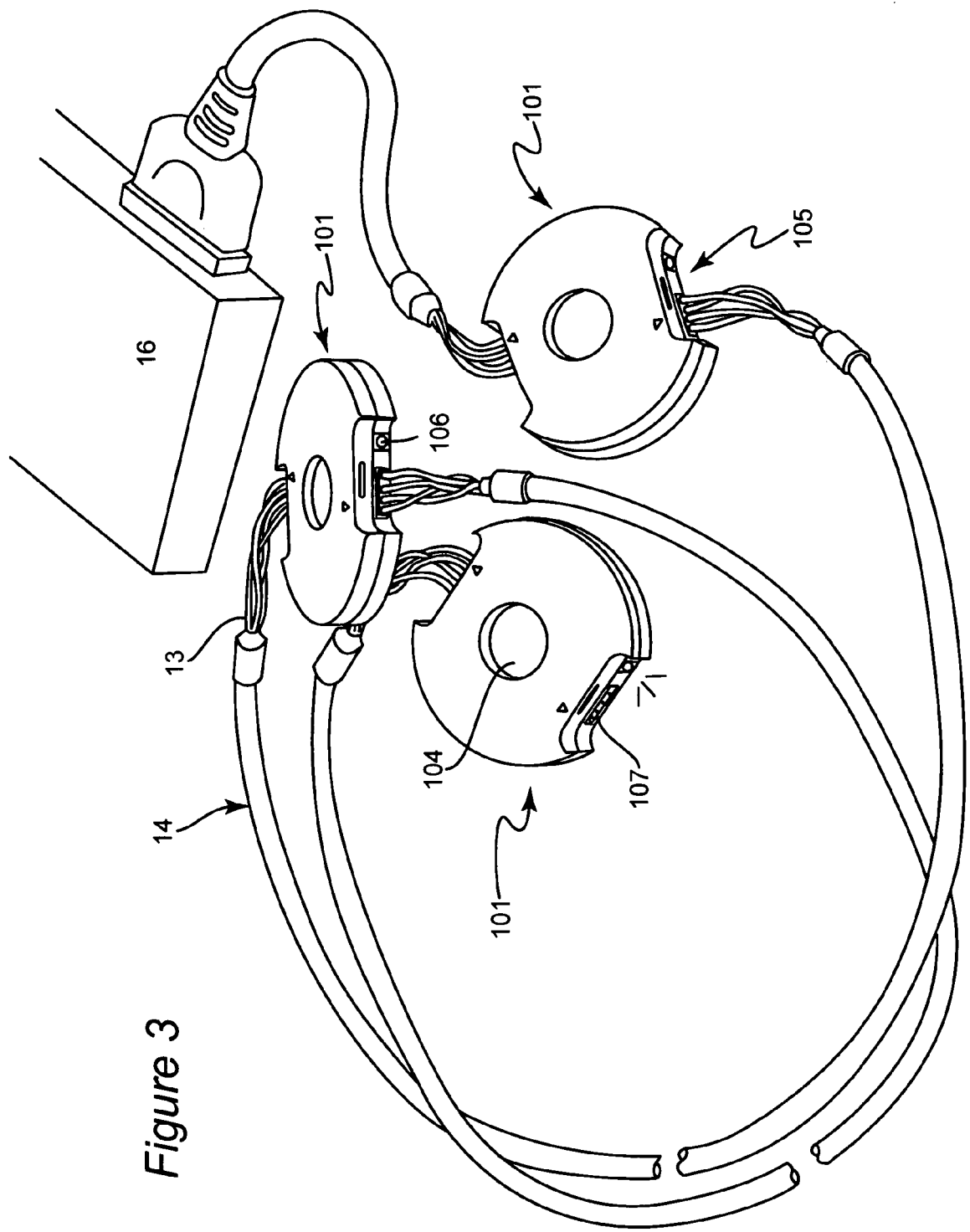
FIG. 3 shows a plurality of UV sensors in a daisy-chain and connected to the data collection module.

Referring now to FIG. 3, a plurality of UV sensors 101 are shown linked in a daisy-chain and connected at one end of the chain to a data collection module (DCM) 16. Each sensor consists of one UV bandwidth defined in nanometers, and includes connectors 107 for inserting a cable 14 that is used to connect to another sensor or to the DCM. The daisy chain can be customized to mix different dynamic ranges (Standard, High, Low) and different spectral bandwidths (UVA, UVB, UVC, UVV) of sensors in the same chain. The DCM 16 collects all of the UV irradiation data from each sensor and can store the data for output to a computer, personal data assistant, or the like (not shown) by cable, infrared, or wireless technology such as the Bluetooth or WiFi standards. The DCM 16 also provides power to all of the sensor units 101 from an internal rechargeable battery via the cables 14 allowing the sensors to take their measurements.

Figure 4:
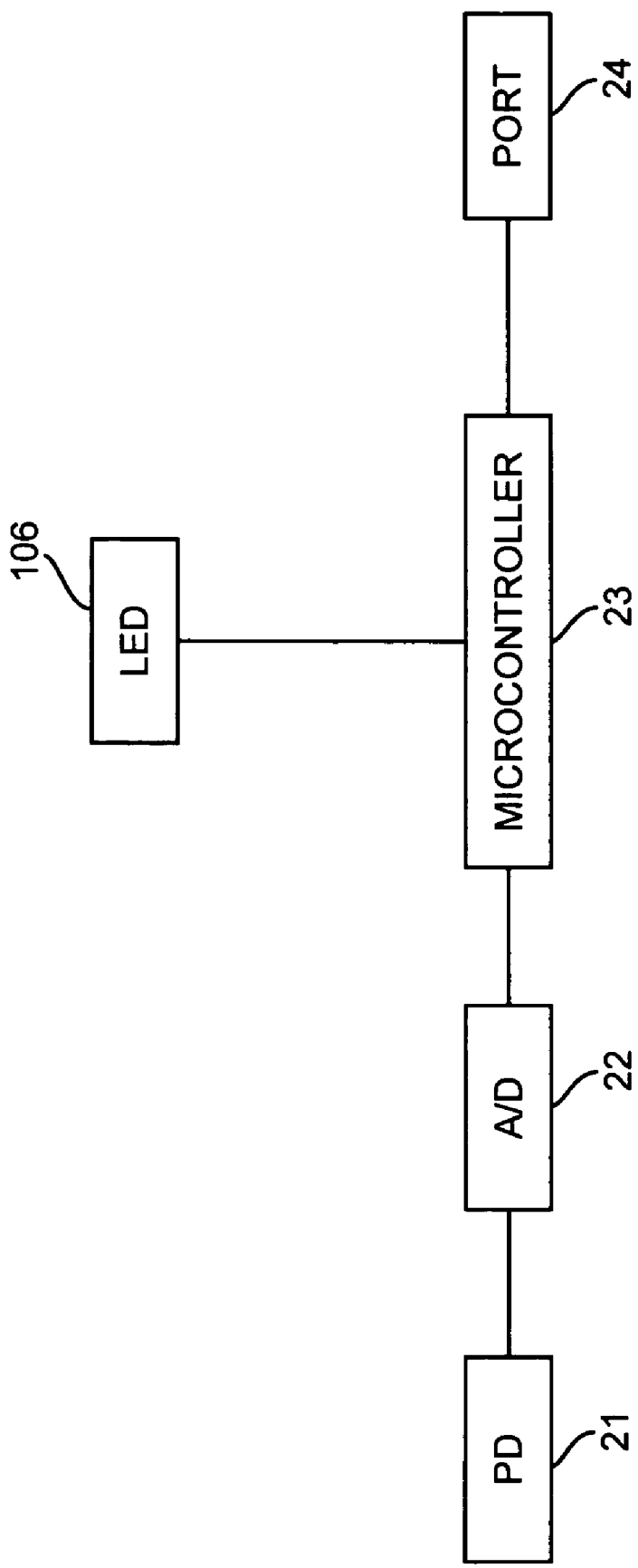
FIG. 4 is a view of the application screen interface providing the measurements to the operator.

The energy levels detected by the sensors 101 are directed to an optical system 21 in the sensor, as shown in the circuitry block diagram in FIG. 4. An analog-to-digital (A/D) converter 22 in the body of the sensor then computes the amount of UV radiation based on signals from the photodetector 21. The A/D converter outputs this data to a microcontroller 23, which can communicate with a port 24, which then transfers the data to the DCM which stores the data corresponding to that sensor. All units in the system communicate information digitally to other components of the system via the daisy chain connection. The DCM can be disconnected from the sensor chain to transport the stored data to a display screen, but this is not required. Data stored in the DCM can then be transferred to a computer for display purposes. The sensors can be tethered to the computer for real-time measurement readings when adjusting the UV lamps.

Figure 5:
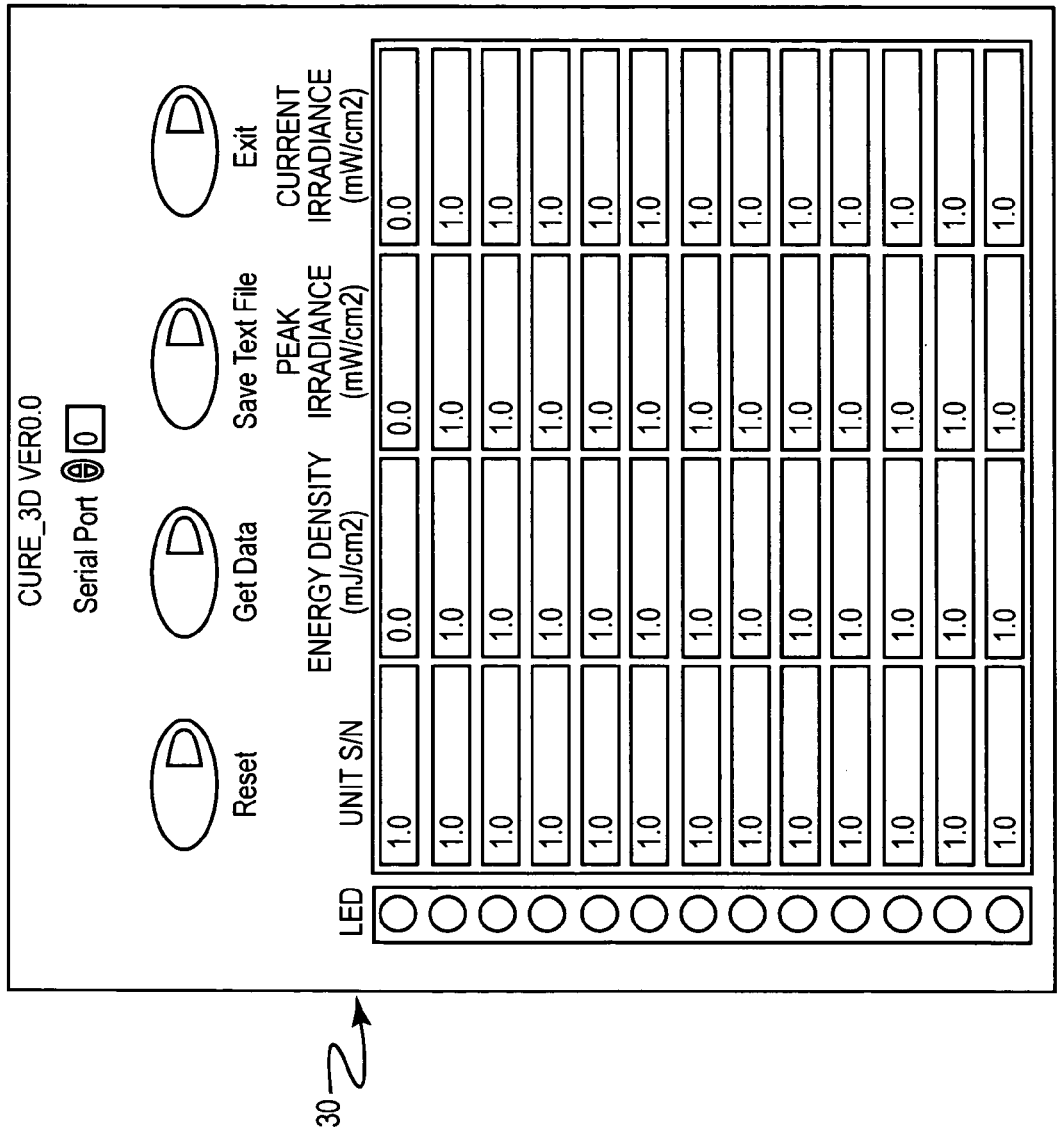
FIG. 5 is a block diagram of the circuitry used to control the radiometer according to the present invention.

FIG. 5 is a screen print of an exemplary display configuration for the data collected. The system also allows for the data to be viewed in other applications (e.g., Microsoft ActiveX®). In the display shown in FIG. 5, each sensor is identified by a unique serial number. Then, the serial numbers are listed in the first column in sequential order as they appear connected to the DCM, or other order as necessary. Each sensor samples and measures energy density (mJ/cm$^2$), peak irradiance (mW/cm$^2$), and current irradiance (mW/cm$^2$). The display screen shown in FIG. 5 is just a sample of possible displays. Additional information can be included, such as the bandwidth of each sensor when different bandwidths are included in the same daisy-chain. The invention is not limited to the information shown in this example.

Each of these data sets are displayed for each sensor and the exposure levels can be analyzed. Each sensor incorporates a light emitting diode 106 within each of the indented regions 105 of the sensor housing which can be activated via the display interface 30. This LED function simplifies the correlation and identification between the data display and the individual sensor whose data is being examined. The LED 106 is connected to the sensor circuitry via the microcontroller 23 as shown in FIG. 4. Although the LED 106 is located within a non-forward facing region with respect to the top surface of the sensor 101, it is sufficiently exposed in an unsecured configuration (e.g., not in the positioner 102, FIG. 3), and the reflected light of the LED 106 onto the positioner 102 is noticeably sufficient in a securely affixed position (e.g., inside the positioner 102, FIG. 2).

When the DCM remains connected to the sensor chain while engaged with a display unit, data can be provided in real time as the measurements are made, allowing for lighting situations to be adjusted across all sensors simultaneously until all sensors are recognized to be receiving sufficient exposure for initiating the curing process. Alternately, if the DCM is detached from the sensor chain, data may be accessed at a point in time after the measurements are made.

Figure 6:
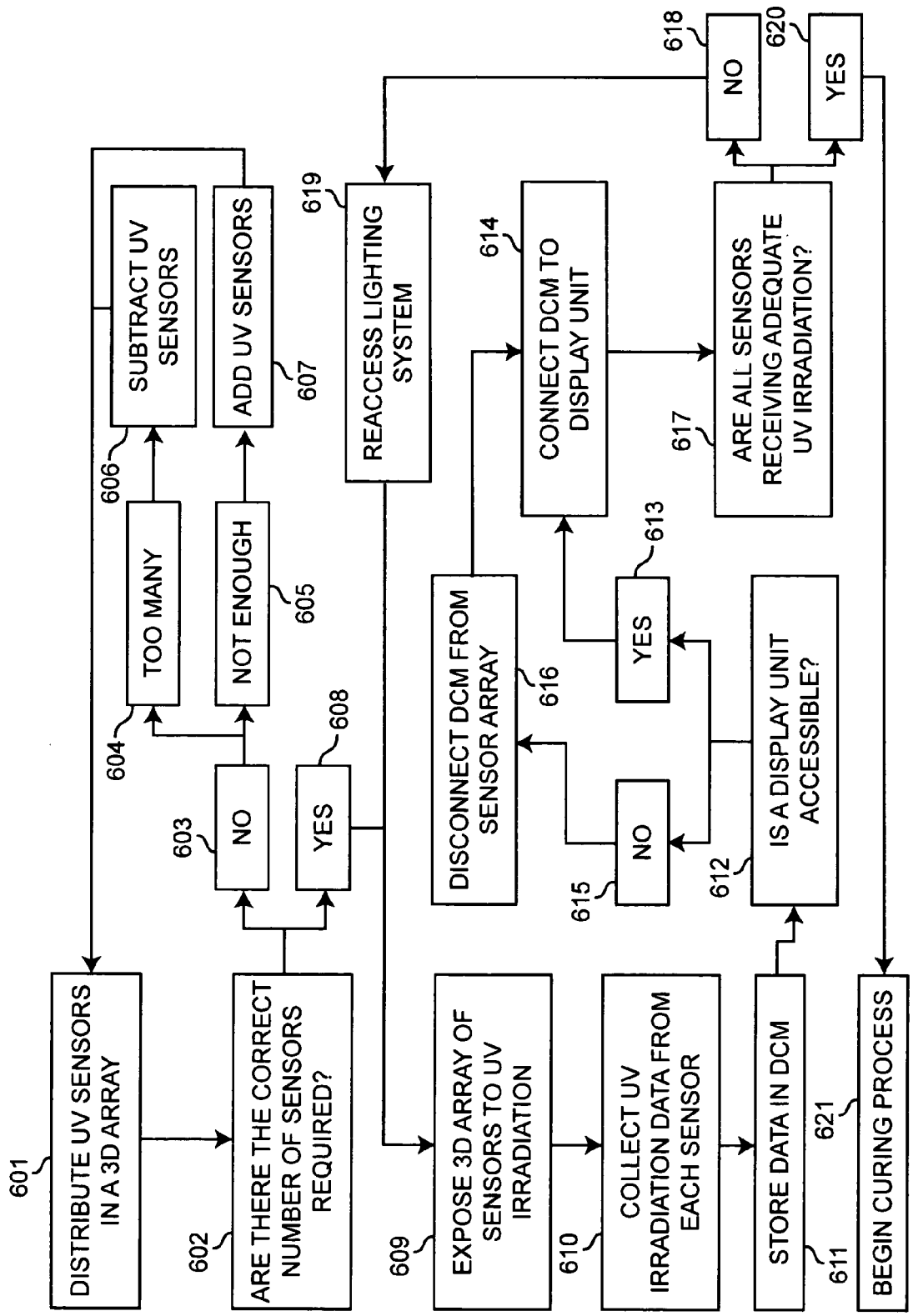
FIG. 6 is a flow diagram of the method according to the current invention.

Referring now to FIG. 6, a method is shown for operating the UV sensor system that is described above. First, a plurality of UV sensors are arranged in a three dimensional array at step 601, where at least two of the sensors are oriented at different angles, different height dimensions, or different width dimensions relative to each other, spatial condition that would generally expose the two sensors to different exposure levels from alight source or an array of lighting sources. The user of the product must determine at step 602 if there are enough sensors distributed on the three dimensional object being measured. If the amount is incorrect, as indicated at step 603, a determination is made at step 604 that there are too many sensors, or at step 605 that there are not enough sensors. The user may subtract UV sensors at step 606 or add UV sensors at step 607, as necessary, preferably up to 32 sensors in a daisy-chain configuration. When an adequate number of sensors are distributed, as determined at step 608, the object having the three-dimensional sensor array is exposed to UV irradiation at step 609. Each sensor collects a measurement of the irradiation data (as in FIG. 4) at step 610, and the data is then stored in the DCM at step 611. The DCM may be connected to a display unit (e.g., a computer or a personal data assistant) while it is connected to the sensor chain, or alternately, the DCM may be disconnected from the chain after measurements are stored and may be connected to a display unit at a later point in time. Thus, in step 612 a determination is made as to whether a display unit is accessible. If so, as determined in step 613, the DCM is connected to the display unit at step 614. If a display unit is not accessible, as determined in step 615, the DCM is disconnected from the sensor array at step 616 and then connected to the display unit at step 614. Once the display unit is connected to the DCM, the measurements taken by each sensor can be individually referenced. A determination is made at step 617 as to whether all sensors are receiving adequate UV irradiation. If the UV irradiation exposure is inadequate, as determined at step 618, the lighting array can be reconfigured at step 619, and new measurements taken. This can occur in real time if the DCM and display are still connected to the array of sensors. Once all sensors exhibit sufficient exposure readings (i.e., the UV exposure required for the particular material to cure as specified by the manufacturer of a material), as determined at step 620, the test piece can be removed, and the curing process can begin for the actual product in step 621.

An alternate embodiment of the invention would have all of the sensors connected to the DCM and to each other wirelessly, by infrared or radio frequency link, such as the Bluetooth or WiFi standards. This configuration would require that each sensor contain an independent power source. Such a power source may include a solar generator, powered by the same UV rays to which the product is inherently exposed to during use.

While the invention has been described in terms of its preferred embodiments, those skilled in the art will recognize that the invention can be practiced with modification within the spirit and scope of the appended

Having thus described our invention, what we claim as new and desire to secure by Letters Patent is as follows:

1. A UV sensor system, comprising:
   a UV sensor comprising an optical system and microprocessor positioned in a housing having an outer surface with a perimeter form, a diameter across said perimeter, and a length in a direction normal to the direction of said diameter, said UV sensor detecting UV irradiation; and
   a positioner for application of said UV sensor to an object, the positioner having a cavity having a depth substantially equal to said length of said UV sensor housing, and having a surface shaped and dimensioned to cooperate with said perimeter form and diameter of said UV sensor housing so that said surface releasably supports said UV sensor.

2. The UV sensor system of claim 1, wherein said positioner has a top and a bottom, and wherein said outer surface of said UV sensor housing is cylindrical such that said perimeter form is a circle, and said cavity of said positioner is a bore hole having a diameter corresponding to the diameter of said housing, which extends from the a top of said positioner to the bottom of said positioner.

3. A UV sensor system, comprising:
   a plurality of UV sensors, each having a UV detector with a planar detecting area, a housing with an outer surface with a perimeter form, a diameter across said perimeter, and a length in a direction normal to the direction of said diameter;
   a plurality of positioners, each of said positioners including a contact surface for contacting an external object and having a cavity shaped and dimensioned corresponding to the perimeter form and length of the UV sensor housing, so as to releasably hold one of said UV sensors while said contact surface contacts the external object;
   a data collection module for collecting UV irradiation data from said UV sensors; and
   cables connecting at least one of said UV sensors to said data collection module, and connecting the remainder of said UV sensors together.

4. The UV sensor system of claim 3, wherein said positioners and said UV sensor housings are constructed and arranged to provide a clearance for said cables when said UV sensors are releasably held by said plurality of positioners and said positioners are in contact with the external object.

* * * * *